United States Patent [19]

Lancaster

[11] 4,040,207
[45] Aug. 9, 1977

[54] SELF-FERTILIZING POT

[76] Inventor: William R. Lancaster, 1157 Petersburg Road, Burlington, Ky. 41005

[21] Appl. No.: 725,778

[22] Filed: Sept. 23, 1976

[51] Int. Cl.² .............................................. A01G 27/00
[52] U.S. Cl. ........................................................ 47/80
[58] Field of Search ............................... 47/66, 79–81

[56] References Cited

U.S. PATENT DOCUMENTS

| | | | |
|---|---|---|---|
| 1,712,986 | 5/1929 | Favata | 47/80 |
| 2,028,255 | 1/1936 | Steinbach | 47/66 |
| 2,135,998 | 11/1938 | Beyer | 47/80 |
| 2,222,815 | 11/1940 | Johnson | 47/66 |
| 2,387,340 | 10/1945 | Moriarty | 47/79 |
| 3,783,555 | 1/1974 | Peters | 47/79 |
| 3,903,644 | 9/1975 | Swift et al. | 47/79 |

FOREIGN PATENT DOCUMENTS 1,470,367  1/1967  France ..................................... 47/79

Primary Examiner—Robert E. Bagwill
Attorney, Agent, or Firm—James W. Pearce; Roy F. Schaeperklaus

[57] ABSTRACT

A self-fertilizing pot which includes outer and inner cup-shaped members which are attached together with a space therebetween. Timed release encapsulated plant food is mounted on one of the cup-shaped members inside the space. Water is introduced into the space to release the plant food. The water passes through openings in the inner cup-shaped member to provide water and plant food for contents of the inner cup-shaped member.

6 Claims, 6 Drawing Figures

SELF-FERTILIZING POT

This invention relates to flower pots. More particularly, this invention relates to a self-fertilizing flower pot.

An object of this invention is to provide a flower pot which incorporates fertilizer that can be released as needed.

A further object of this invention is to provide a flower pot which releases fertilizer as contents of the flower pot are watered.

A further object of this invention is to provide a flower pot having a chamber or space in which fertilizer is stored and through which water passes to cause release of the fertilizer and watering of the contents of the flower pot.

Briefly, this invention provides a flower pot which includes an inner cup-shaped member which receives soil or the like and an outer cup-shaped member surrounding the inner cup-shaped member with a space being formed therebetween. Fertilizer particles can be adhesively mounted on the outer face of the inner cup-shaped member. An outwardly extending annular flange mounted on the inner member is attached to the upper portion of the outer member. The flange forms an upper wall or top plate for the space. Perforations in the flange permit introduction of water into the space to cause release of the fertilizer. Openings in the lower portion and sides of the inner member permit the water and fertilizer carried thereby to enter the soil in the inner member.

The above and other objects and features of the invention will be apparent to those skilled in the art to which this invention pertains from the following detailed description and the drawings, in which.

In the following detailed description and the drawings, like reference characters indicate like parts.

Figure 1:
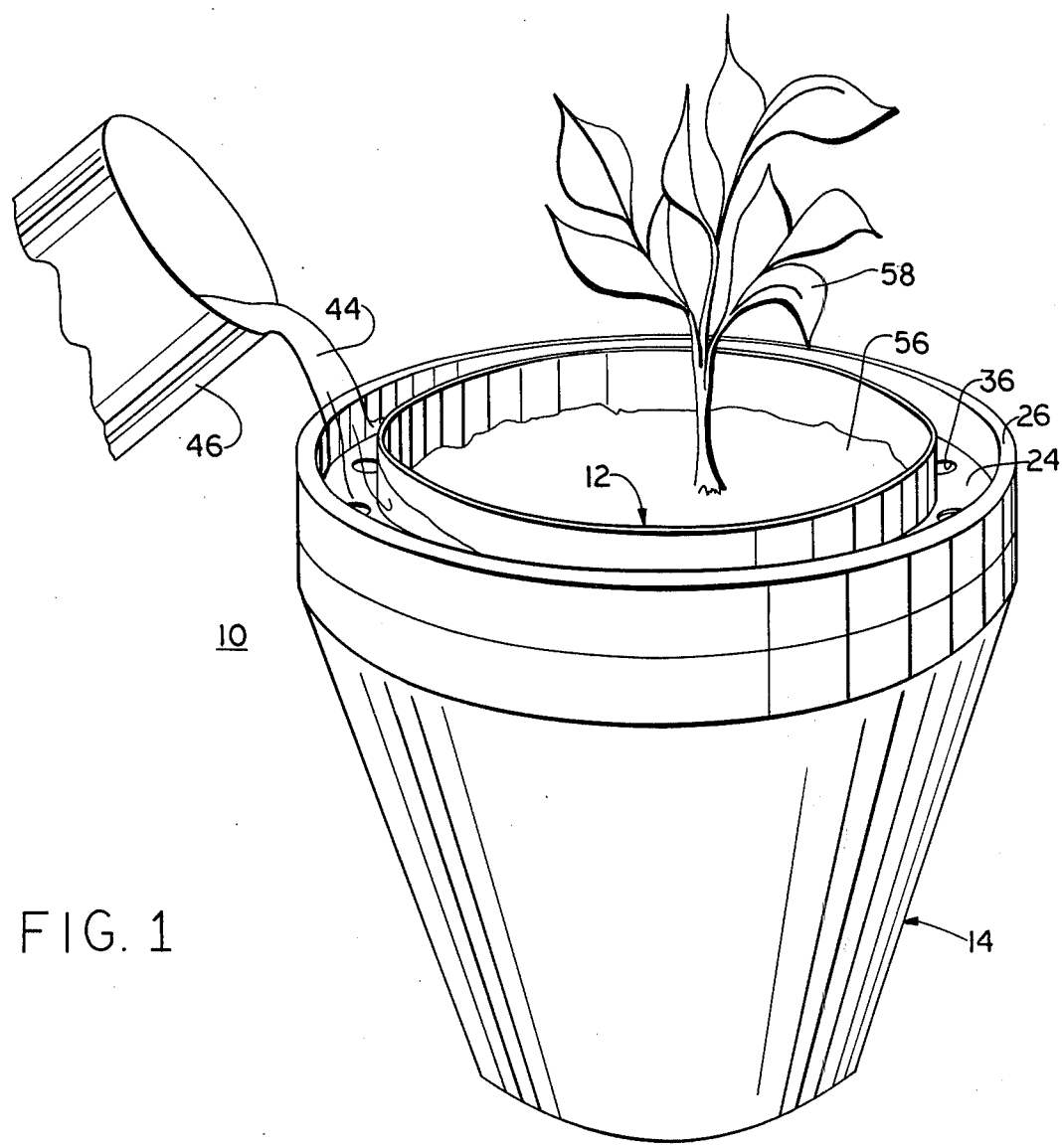
FIG. 1 is a perspective view of a flower pot constructed in accordance with an embodiment of this invention, a fragmentary part of a cup of water being shown in association therewith, soil and a plant being shown therein.

In FIG. 1 is shown a flower pot 10 constructed in accordance with an embodiment of this invention. The flower pot 10 includes an inner generally cup-shaped member 12 and an outer generally cup-shaped member 14.

Figure 2:
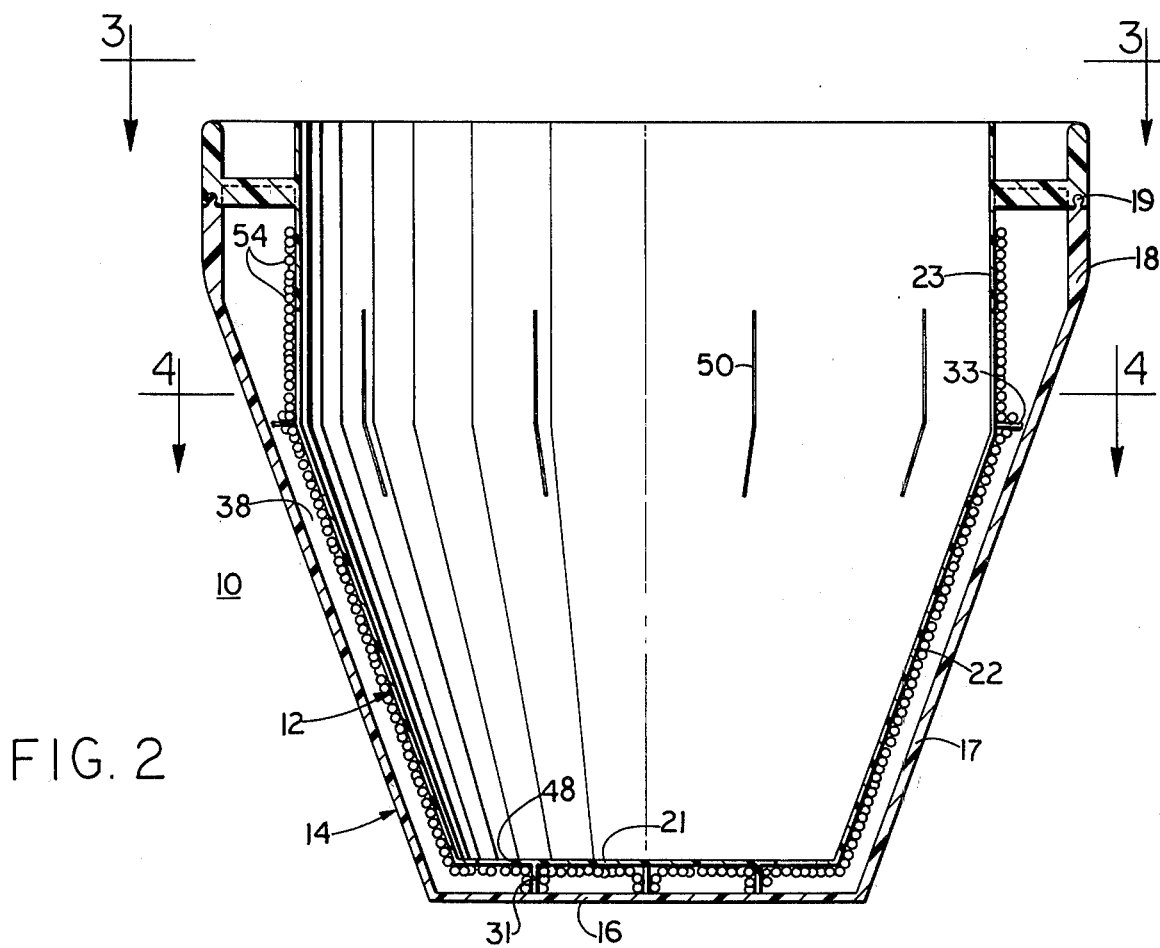
FIG. 2 is a view in upright section of the flower pot illustrated in FIG. 1.

As shown in FIG. 2, the outer cup-shaped member 14 includes a circular bottom plate 16, a frusto-conic main wall portion 17 extending upwardly from the bottom plate 16, and a cylindrical upper wall portion 18 extending upwardly from the main wall portion 17 and terminating in an annular detent rib 19. The inner cup-shaped member 12 includes a circular bottom plate 21, a frusto-conic main wall portion 22 and an upper cylindrical wall portion 23.

Figure 5:
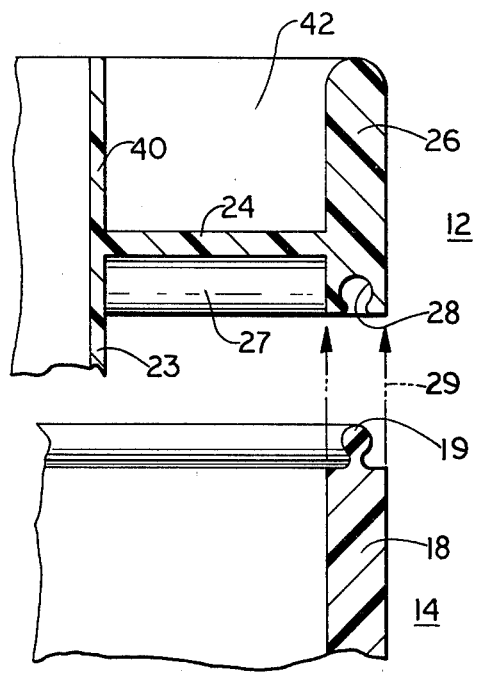
FIG. 5 is an exploded view in section taken on an enlarged scale on the line 5—5 in FIG. 3.

An annular trough bottom plate 24 (FIG. 5) extends outwardly of the upper cylindrical wall portion 23 and carries an upright annular trough outer wall 26. Strengthening ribs 27 are integral with the trough bottom plate 24, the trough outer wall 26 and the upper cylindrical wall portion 23. A lower edge portion of the trough outer wall 26 is provided with a circular slot 28 which is arranged to receive the annular detent rib 19 of the outer cup-shaped member 14 when the inner and outer cup-shaped members 12 and 14 are brought together as indicated by the arrows 29 in FIG. 5 to lock the inner and outer cup-shaped members 12 and 14 in assembled relation. The rib 19 is received in the slot 28 in watertight sealing relation.

Figure 4:
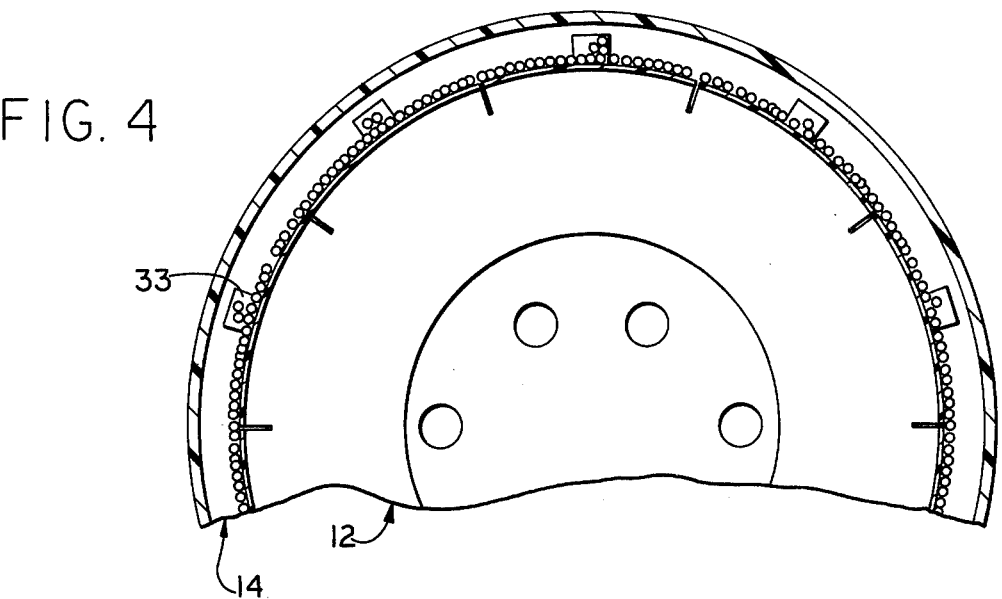
FIG. 4 is a view in section taken on the line 4—4 in FIG. 2.
Figure 3:
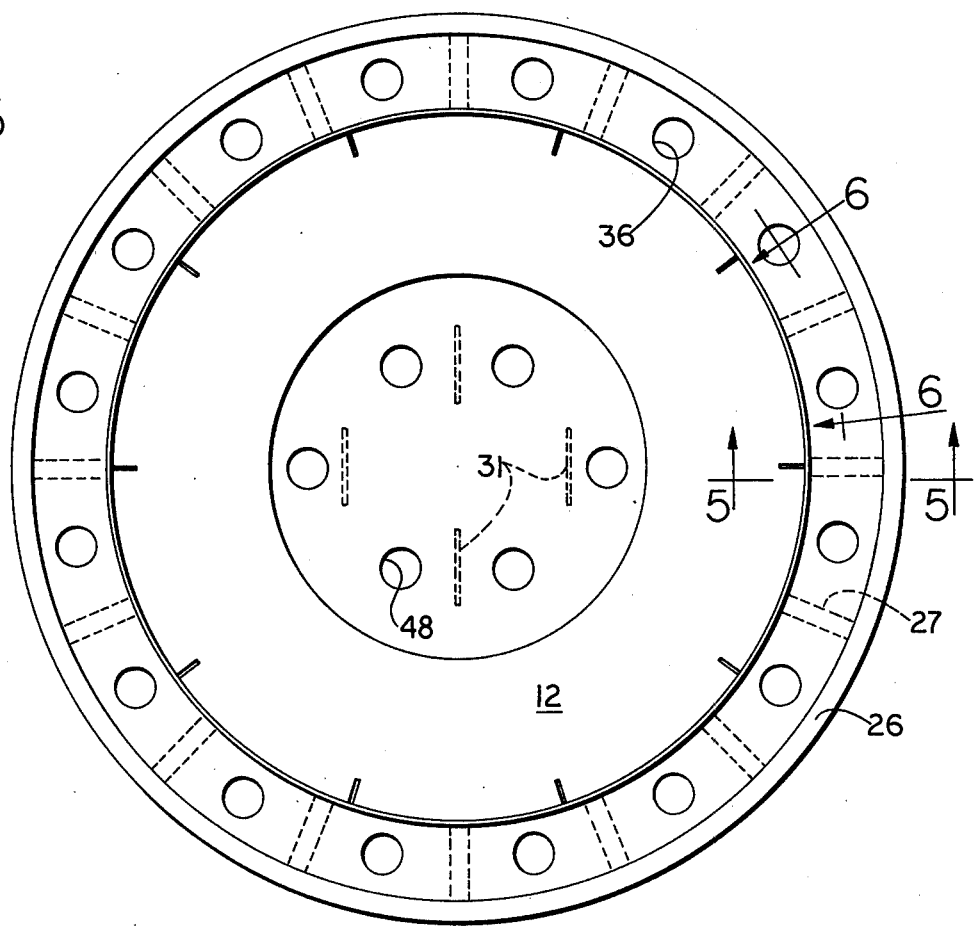
FIG. 3 is a plan view of the flower pot looking in the direction of the arrows 3—3 in FIG. 2.

Downwardly extending lugs 31 (FIGS. 2 and 3) are mounted on the underside of the circular bottom plate 21 of the inner cup-shaped member 12 and rest on the circular bottom plate 16 of the outer cup-shaped member 14. Outwardly extending lugs 33 (FIGS. 2 and 4) are mounted on the wall of the inner cup-shaped member 12 at the intersection between the frusto-conic main wall portion 22 and the cylindrical wall portion 23. The lugs 33 are engageable with the frusto-conic main wall portion 17 of the outer cup-shaped member 14 to limit sidewise movement of the lower section of the inner cup-shaped member 12.

Figure 6:
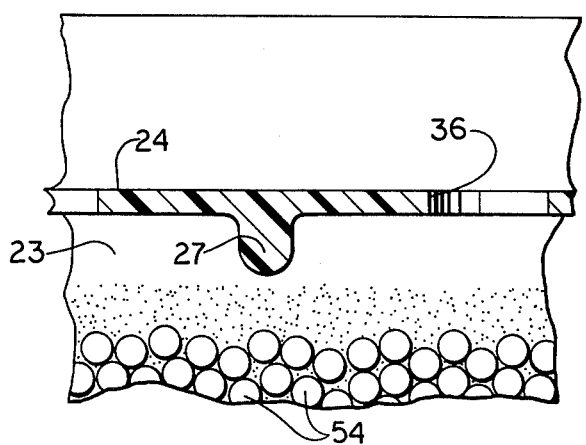
FIG. 6 is a view in section taken on the line 6—6 in FIG. 3.

Perforations 36 (FIGS. 3 and 6) are formed in the trough bottom plate 24 to permit entry of water into a space 38 (FIG. 2) between the inner and outer cup-shaped members 12 and 14. The trough bottom plate 24, the trough outer wall 26, and an upper section 40 (FIG. 5) of the upper cylindrical wall portion 23 of the inner cup-shaped member 12 form a trough 42 into which water 44 (FIG. 1) can be poured from an appropriate container 46. The water can progress from the space 38 (FIG. 2) through perforations 48 in the circular base plate 21 and through elongated upright slits 50 in the wall portions 22 and 23 of the inner cup-shaped member into the interior of the inner cup-shaped member 12. The slits also permit breathing of the pot.

Pellets 54 of timed release encapsulated plant food are adhesively attached to the outside of the inner cup-shaped member 12 inside the space 38. The pellets 54 can be of the type known as PRECISE Brand, a trademark of Minnesota Mining and Manufacturing Company and which release nutrients upon contact with water. The pellets 54 are mounted on the outside of the inner cup-shaped member before the members 12 and 14 are assembled. The pellets can be attached to the outside of the inner cup-shaped member 12 by an appropriate adhesive. The adhesive can be applied to the outer face of the bottom plate 21, the main wall portion 22 and the portion of the cylindrical wall portion 23 below the trough bottom plate 24. The inner cup-shaped member can be rolled in the pellets so that a layer of pellets is picked up and adheres thereto, or the pellets 54 can otherwise be adhesively attached thereto. As the water 44 (FIG. 1) passes through the space 38, the water picks up fertilizer from the timed release pellets 54 and carries the fertilizer into earth 56 inside the inner cup-shaped member 12 to provide fertilizer for a plant 58 growing in the earth 56. The water 44 passes from the space 38 through the perforations 48 and the slits 50. The slits 50 can be sufficiently narrow to prevent passage of the pellets 54, and can be approximately one sixty-fourth inches wide.

The cup-shaped members 12 and 14 can be formed of appropriate impermeable plastic resin material or the like. The inner cup-shaped member 12 is preferably formed of transparent plastic resin material so that the pellets 54 can be observed therethrough before the earth 56 is placed inside the inner cup-shaped member 12. The outer cup-shaped member 14 can be opaque and can be of any selected color.

The self-fertilizing flower pot illustrated in the drawings and described above is subject to structural modification without departing from the spirit and scope of the appended claims.

Having described my invention, what I claim as new and desire to secure by letters patent is:

1. A self-fertilizing pot which comprises an outer cup-shaped member, an inner cup-shaped member, means for attaching the cup-shaped members together with a space therebetween, timed release encapsulated plant food mounted on one of the cup-shaped members inside the space, and means for introducing water into the space to cause release of the plant food, there being opening means in the inner cup-shaped member to permit the water and plant food to enter the inner cup-shaped member to water and fertilize contents of the inner cup-shaped member, the inner cup-shaped member including a bottom plate, an annular wall extending upwardly from the inner member bottom plate, an annular trough bottom plate extending outwardly from an upper portion of the inner member annular wall, and an annular upright outer trough wall carried by the trough bottom plate, the outer cup-shaped member including a bottom plate and an annular wall extending upwardly from the outer member bottom plate, the means for attaching the cup-shaped members together including interacting detent means on the upright outer trough wall and the outer member annular wall.

2. A self-fertilizing pot as in claim 1 wherein the interacting detent means on the upright trough wall and the outer member annular wall includes an annular rib on one of said walls and a circular slot in the other of said walls, said annular rib fitting inside the circular slot in water-tight relation therewith.

3. A self-fertilizing pot which comprises an outer cup-shaped member, an inner cup-shaped member, means for attaching the cup-shaped members together with a space therebetween, timed release encapsulated food mounted on one of the cup-shaped members inside the space, and means for introducing water into the space to cause release of the plant food, there being opening means in the inner cup-shaped member to permit the water and plant food to enter the inner cup-shaped member to water and fertilize contents of the inner cup-shaped member, one of the cup-shaped members including a bottom plate, an annular wall extending upwardly from the bottom plate, an annular trough bottom plate mounted on an upper portion of the annular wall, and an annular upright trough wall carried by the trough bottom plate, the other cup-shaped member including a bottom plate and an annular wall extending upwardly from the other member bottom plate, the means for attaching the cup-shaped members together including interacting detent means on the upright trough wall and the other member annular wall.

4. A self-fertilizing pot as in claim 3 wherein the timed release encapsulated plant food includes a multitude of capsules mounted on and substantially covering the wall of one of the cup-shaped members inside the space 5. A self-fertilizing pot which comprises an outer cup-shaped member, an inner cup-shaped member, each of the cup-shaped members including a bottom plate and an annular wall extending upwardly from the bottom plate, one of said cup-shaped members including an annular trough bottom plate mounted on an upper portion of the annular wall and extending to cooperate with the annular wall of the other cup shaped member, means for attaching the cup-shaped members together with a space above the annular trough bottom plate forming a water receiving trough and below the trough bottom plate a plant feeding and watering solution preparation chamber, a multitude of capsules of timed release plant food mounted on and substantially covering the wall of one of the cup-shaped members inside the plant feeding and watering solution preparation chamber, and means for introducing water from the trough into the chamber to cause release of the plant food into the water to form a plant feeding and watering solution, there being opening means in the inner cup-shaped member to permit the plant feeding and watering solution to enter the inner cup-shaped member to water and feed contents of the inner cup-shaped member.

6. A self-fertilizing pot in accordance with claim 5 characterized by the means for attaching the cup-shaped members together including interacting detent means on the other cup-shaped member annular wall and the annular trough bottom plate.

* * * * *

UNITED STATES PATENT OFFICE
CERTIFICATE OF CORRECTION

Patent No. 4,040,207   Dated   August 9, 1977

Inventor(s) William R. Lancaster

It is certified that error appears in the above-identified patent and that said Letters Patent are hereby corrected as shown below:

Column 3, line 45, before "food" insert --plant--.

Signed and Sealed this

First Day of November 1977

[SEAL]

Attest:

RUTH C. MASON
Attesting Officer

LUTRELLE F. PARKER
Acting Commissioner of Patents and Trademarks